(12) United States Patent
Trudeau et al.

(10) Patent No.: US 6,591,197 B2
(45) Date of Patent: Jul. 8, 2003

(54) FIBER ORIENTATION VERIFICATION FOR A COMPOSITE ARTICLE

(75) Inventors: Allen E. Trudeau, Milford, CT (US); Jeffry C. Purse, Branford, CT (US)

(73) Assignee: Sikorsky Aircraft Corporation, Strattford, CT (US)

(*) Notice: Subject to any disclaimer, the term of this patent is extended or adjusted under 35 U.S.C. 154(b) by 0 days.

(21) Appl. No.: 09/842,429

(22) Filed: Apr. 25, 2001

(65) Prior Publication Data

US 2002/0004707 A1 Jan. 10, 2002

Related U.S. Application Data

(60) Provisional application No. 60/201,101, filed on May 2, 2000.

(51) Int. Cl.[7] .......................... G06F 19/00; B32B 15/00
(52) U.S. Cl. .......................... 702/33; 702/150; 428/689
(58) Field of Search .............................. 702/33, 34, 40, 702/155, 159; 156/350, 351, 364, 556, 176–179; 428/461, 689, 692

(56) References Cited

U.S. PATENT DOCUMENTS

| 5,087,187 A | 2/1992 | Simkulak et al. |
| 5,209,804 A | * 5/1993 | Trudeau ................. 156/364 |
| 5,290,386 A | * 3/1994 | Trudeau ................. 156/350 |
| 5,571,357 A | 11/1996 | Darrieux et al. |
| 5,939,007 A | 8/1999 | Iszczyszyn et al. |
| 6,025,285 A | 2/2000 | Vyakarnam et al. |
| 6,027,786 A | 2/2000 | Ford |
| 6,048,622 A | * 4/2000 | Hagood, IV et al. ....... 428/461 |
| 6,103,337 A | 8/2000 | Burgess |

* cited by examiner

Primary Examiner—Bryan Bui
(74) Attorney, Agent, or Firm—Carlson, Gaskey & Olds

(57) ABSTRACT

A fiber orientation verification system includes a sensor and an indicator to identify the fiber orientation within each sequentially laid composite material layer. The indicator projects visible indicator lines upon the lay-up surface which are indicative of a desired orientation for the composite material layer. The sensor and the indicator communicate with a computer module which contains a database including a detailed sequence to assure that each layer is proper placed. The operator is thereby provided with an exact location to lay-up each composite material layer and the proper fiber orientation of that layer. Continued verification is thus provided to the operator.

22 Claims, 3 Drawing Sheets

FIBER ORIENTATION VERIFICATION FOR A COMPOSITE ARTICLE

The present application claims priority to U.S. Provisional Patent Application Ser. No. 60/201,101, filed May 2, 2000.

BACKGROUND OF THE INVENTION

The present invention relates to fiber reinforced resin matrix composites, and more particularly, to a method facilitating the manufacture thereof which assures that each composite layer is properly oriented.

A rotor blade spar is the foremost structural element of a helicopter rotor blade assembly inasmuch as its primary function is to transfer combined flapwise, edgewise, torsional and centrifugal loads to/from a central torque drive hub member. The spar typically extends the full length of the rotor blade and mounts at its inboard end to a cuff assembly or fitting which facilitates mounting to the hub member. Due to the extreme operational loading environment of the rotor blade, fiber reinforced resin matrix composite materials, e.g., Kevlar, graphite and fiberglass, have been employed due to their advantageous strength to weight ratio, corrosion resistance, and improved damage tolerance.

To maximize the benefits of composites it is essential that the fiber orientation be optimally tailored to meet the strength and stiffness requirements for a particular application. That is, composites can be tailored to be anisotropic (capable of carrying load in a particular direction) rather than quasisotropic (equal strength in all directions); hence, orienting the fibers in the direction of the load will optimally result in the most weight efficient structure.

These considerations must be balanced against the cost and complexity of a particular fabrication technique. One technique for manufacturing composite components includes prepreg lay-up of composite materials. The prepreg lay-up technique employs the use of discrete plies or layers of pre-impregnated composite fabric, which are hand-stacked and interleaved over a mandrel assembly. The mandrel assembly is placed in a matched metal mold and cured in an autoclave oven for application of heat and pressure.

As described above, to assure the desired strength is achieved, the fiber orientation of each discrete laminate must be assured. This process is extremely time and labor intensive. Because many layers must be hand stacked, and each layer must be properly oriented during the hand lay-up process, there is a relatively high probability of operator error, e.g., an operator may inadvertently omit a layer in a multi-ply laminate or fail to properly orient one or more layers. The critical nature of this laborious hand lay-up process is such that a quality assurance inspector typically observes an operator during the process to assure no errors are made.

Accordingly, it is desirable to provide a method facilitating the manufacture of a composite structure which assures that each composite layer is properly oriented while minimizing the necessity of additional quality assurance personnel.

SUMMARY OF THE INVENTION

A fiber orientation verification system according to the present invention provides a sensor and an indicator above a lay-up surface such that each has a view of the lay-up surface. The sensor is preferably a digital camera to identify the fiber orientation within each sequentially laid composite material layer. In one embodiment, each composite material layer includes a contrasting strand which is readily identifiable. The indicator is preferably a laser projector which projects visible indicator lines upon the lay-up surface to indicate a desired orientation for the composite material layer.

The sensor and the indicator communicate with a computer module which contains a database including a detailed sequence of composite material layers, fiber orientation, indicator display programs, quality assurance and operator interfaces to assure that each layer is proper placed as described below.

The computer module initially refers to a desired database to obtain a sequence of composite material layers and fiber orientation of the desired composite component to which the system will verify. In response to the particular database, the computer module communicates with the indicator to project a plurality of visible indicator lines upon the lay-up surface. The indicator also projects an outline of the first composite material layer such that the operator is provided with a guide for accurate placement. The operator is thereby provided with an exact location to lay-up the first composite material layer and the proper fiber orientation of that layer. The display also indicates to the operator which step he is currently performing and confirmation as to the proper composite material layer type for that step, e.g. fiberglass, Kevlar, carbon fiber, or the like. Continued verification is thus preferably continually provided to the operator.

Once the operator positions a composite material layer, the computer module communicates with the sensor to identify the fiber orientation of that layer. The CPU compares the sensed fiber orientation to the proper orientation contained in the database for that particular step. Once the fiber orientation is determined, the CPU identifies whether the sensed fiber orientation is equivalent to the predetermined fiber orientation for that particular step. If the operator has properly positioned the composite material layer, the CPU moves to the next step (next lay-up layer) in the database. This process continues until the lay-up is complete.

Should, however, the operator fail to properly position or orient a composite material layer, the CPU will identify the incorrect layer and provide an alert to the operator. The operator is thereby alerted to the improper step, provided with the proper indicator lines and outline while being prevented from proceeding to the next layer.

The present invention therefore provides a system and method which facilitates the manufacture of a composite structure which assures that each composite layer is properly oriented while minimizing the necessity of additional quality assurance personnel.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
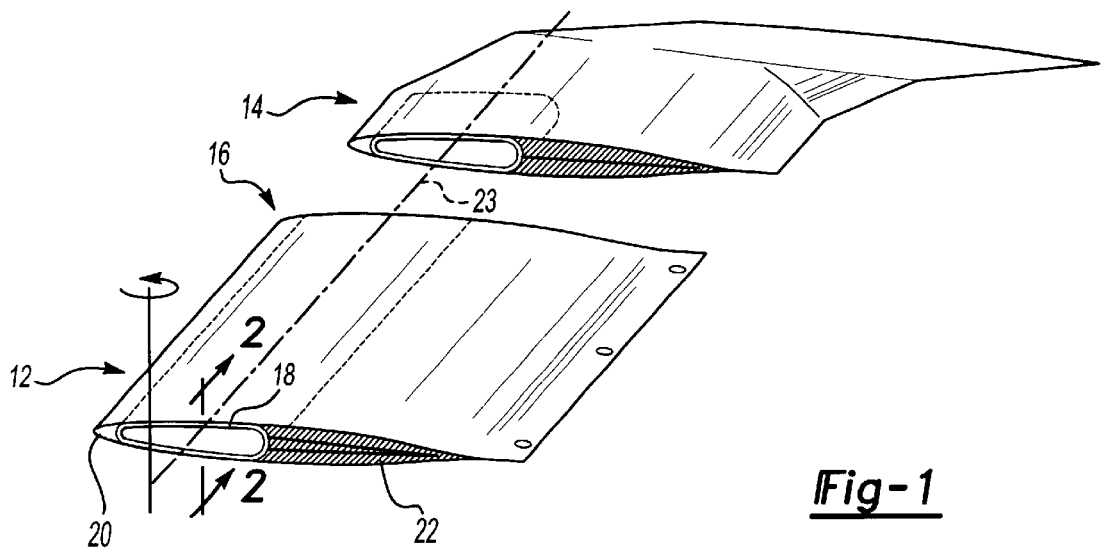
FIG. 1 is a general perspective view an composite component.

FIG. 1 illustrates a partial perspective view of the root and tip sections 12 and 14, respectively, of a helicopter rotor blade assembly 16 having an elliptically shaped composite spar 18 disposed between a leading edge sheath assembly 20 and trailing edge pocket assembly 22. The composite spar 18 extends from the root end portion 12 to the tip end portion 14 along a longitudinal axis 23.

For the purposes of discussion the composite spar 18 includes a plurality of composite material layers which are selectively arranged and material properties selectively chosen to achieve the foregoing objectives. It should be understood that although a rotor blade spare is illustrated in the disclosed embodiment, other multi-layer composite structures will also benefit from the present invention.

Figure 2:
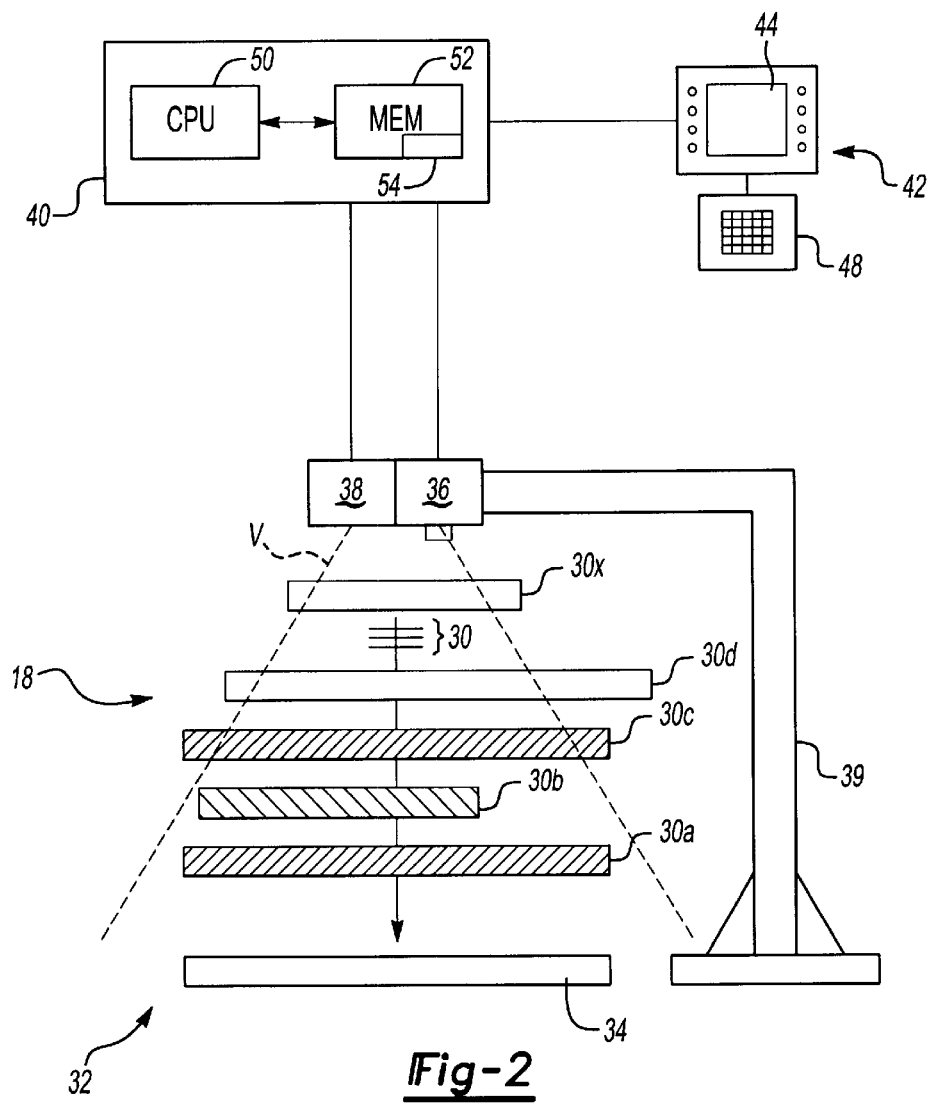
FIG. 2 is a schematic exploded representation of a plurality of composite material layers adjacent a fiber orientation verification system of the present invention.

Referring to FIG. 2, a schematic exploded representation of a plurality of composite material layers 30a–30x are illustrated relative to a fiber orientation verification system 32 according to the present invention. It should be understood that although only 5 composite material layers 30a–30x are illustrated in the disclosed embodiment, this is for clarity only and in actuality a many composite material layers 30a–30x are typically provided to form a single composite component such as the representative composite spar 18.

A lay-up surface 34 such as a mandrel assembly provides a work surface for an operator to hand-stack and interleave the composite material layers 30a–30x. As is known, the lay-up surface is particularly tailored to the finished component and further description of the details thereof need not be provided herein.

A sensor 36 and an indicator 38 are arranged adjacent the lay-up surface 34. Preferably, a support structure 39 mounts the sensor 36 and indicator 38 above the lay-up surface 34 so that each have a view V of the lay-up surface 34.

The sensor 36 is preferably, a digital camera, however, other sensors 36 such as visible, electromagnetic, X-ray, or the like will benefit from the present invention. A still image processor sensor or a motion picture sensor will also benefit herefrom. The sensor 36 operates to identify the fiber orientation within each composite material layers 30a–30x. That is, the sensor 36 provides the necessary resolution to identify the fibers within each composite material layers 30a–30x.

Figure 4A:
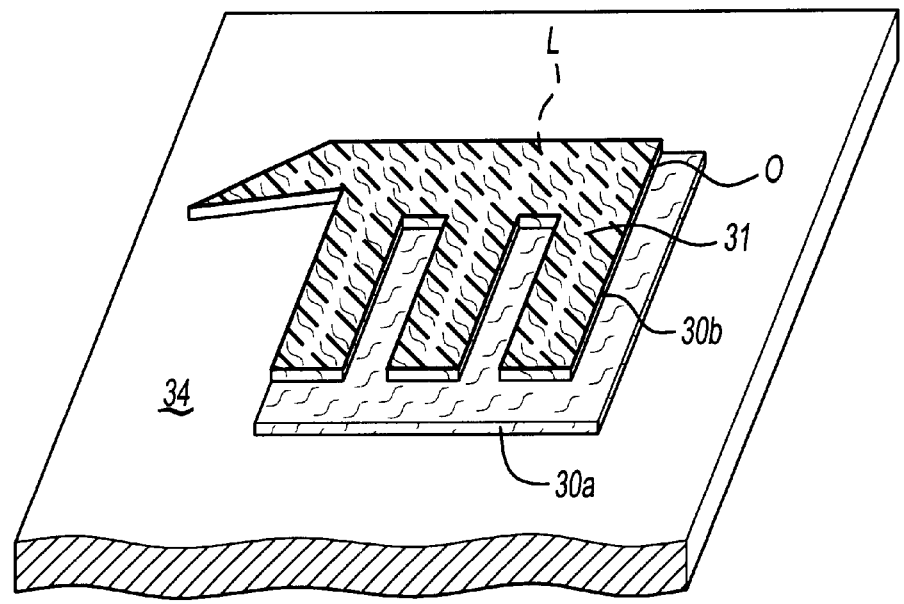
FIG. 4A is a schematic view of one layer of a composite material and the indicators provided by the present invention.

In one embodiment, each composite material layers 30a–30x includes a contrasting strand 31 (FIG. 4A) which is readily identifiable with greater clarity within each composite material layers 30a–30x such that the fiber orientation is more readily identifiable. The contrasting strand 31 is preferably visibly identifiable, however, other identifiable contrast such as a metal fiber will also benefit from the present invention. Additionally, or in the alternative, the contrasting strand 31 may not be identifiable in the visible spectrum but may be clearly visible in, for example only, the infrared spectrum.

The indicator 38 is preferably, a laser projector. The indicator 38 projects a plurality of visible indicator lines L (FIG. 4A) upon the lay-up surface 34. The lines are indicative of a desired orientation for the next composite material layers 30a–30x to be applied by an operator. It should be understood that other indicators such as an arrow, segmented lines, symbols or the like will also benefit from the present invention. The indicator 38 also preferably projects an outline O of the composite material layers 30a–30x such that the operator is provided with a guide for accurate placement of the composite material layers 30a–30x. This is particularly advantageous should each layer not be identical in shape.

The sensor 36 and the indicator 38 communicate with a computer module 40 which is connected to an Operator Interface Module ("OIM") 42 including input and output devices. The OIM 42 includes a display 44, such as a high resolution LCD or flat panel display, and an audio speaker 46. The OIM 22 also includes input devices 48, preferably a plurality of buttons and directional keypad, but alternatively including a mouse, keyboard, keypad, remote device or microphone. Alternatively, the display 44 can be a touch screen display.

The computer module 40 includes a CPU (illustrated schematically at 50) and storage device 52 connected to the CPU 50. The storage device 52 may include a hard drive, CD ROM, DVD, RAM, ROM or other optically readable storage, magnetic storage or integrated circuit. The storage device 52 contains a database (illustrated schematically at 54) including a detailed sequence of composite material layers 30a–30x, fiber orientation, indicator display programs, quality assurance and operator interface as will be further described below. The software for the CPU 42, may also be stored in the storage device 52 or alternatively in ROM, RAM or flash memory.

A method for producing the above mentioned composite spar utilizing the fiber orientation verification system will now be described. However, it should be realized that the use of a composite spar is for illustrative purposes only, and that the methodology of the present invention may be applied to other components.

Figure 3:
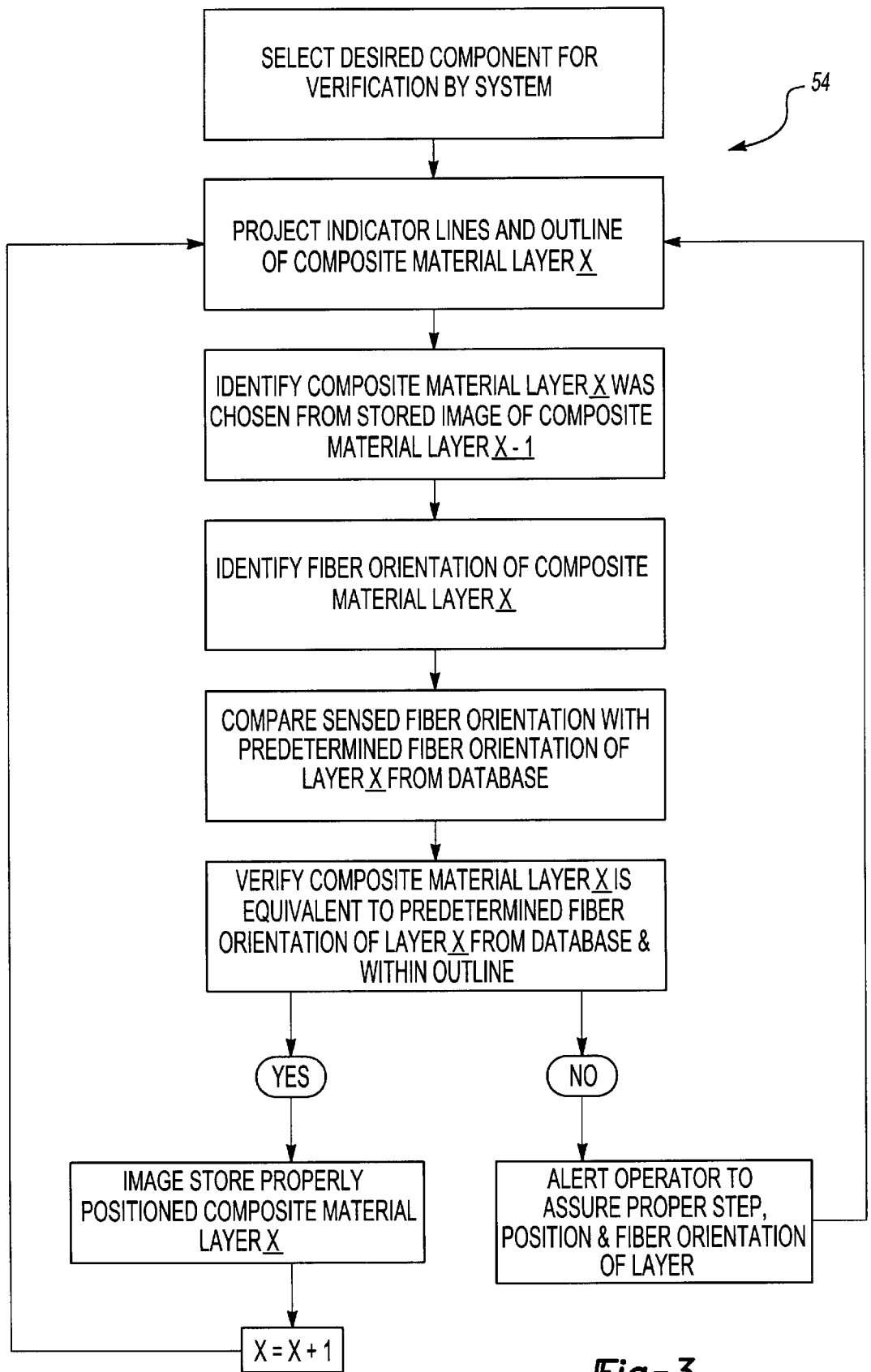
FIG. 3 is a flow chart illustrating the steps performed by the fiber orientation verification system.

Referring to FIG. 3, a flow chart illustrating operation of the present invention is provided. The instructions for the flow chart are preferably stored in the database 54 (FIG. 2). The computer module 40 initially refers to the desired database to obtain the sequence of composite material layers and fiber orientation of the desired composite component to which the system 32 will verify. An operator may select the proper component or the system 32 may be dedicated to a certain component. In addition, the display 44 preferably confirms the selected component and provides an overview of the process which the operator is to follow.

In response to the particular database, the computer module 40 communicates with the indicator 38 to project a plurality of visible indicator lines L (FIG. 4A) upon the lay-up surface 34. The indicator 38 also projects an outline O of the first composite material layers 30a such that the operator is provided with a guide for accurate placement of the first composite material layer 30a. The operator is thereby provided with an exact location to lay-up the first composite material layer 30a and the proper fiber orientation of that layer. The display 44 also indicates to the operator that he is currently performing the first lay-up and provides further confirmation as to the first composite material layer 30a type, e.g. fiberglass, Kevlar, carbon fiber, or the like. Continued verification is thus preferably continually provided to the operator.

Once the operator positions the first composite material layer 30a, the computer module communicates with the sensor 36 to identify the fiber orientation of the first composite material layer. In one embodiment, the contrasting strand 31 may be provided such that the fiber orientation is readily identifiable to the sensor 36. In another embodiment, a digital photograph of the first composite material layer 30a is provided to the CPU 42 for processing. The CPU 42 compares the sensed fiber orientation to the proper orientation contained in the database for that particular step.

Once the fiber orientation comparison is determined, the CPU42 identifies whether the sensed fiber orientation is equivalent to the predetermined fiber orientation of the particular step. If the operator properly positions the first composite material layer 30a, the CPU 42 moves to the next step (next lay-up layer) in the database. The first image of the properly located and oriented first composite material layer 30a is also preferably stored in the storage device 42.

Figure 4B:
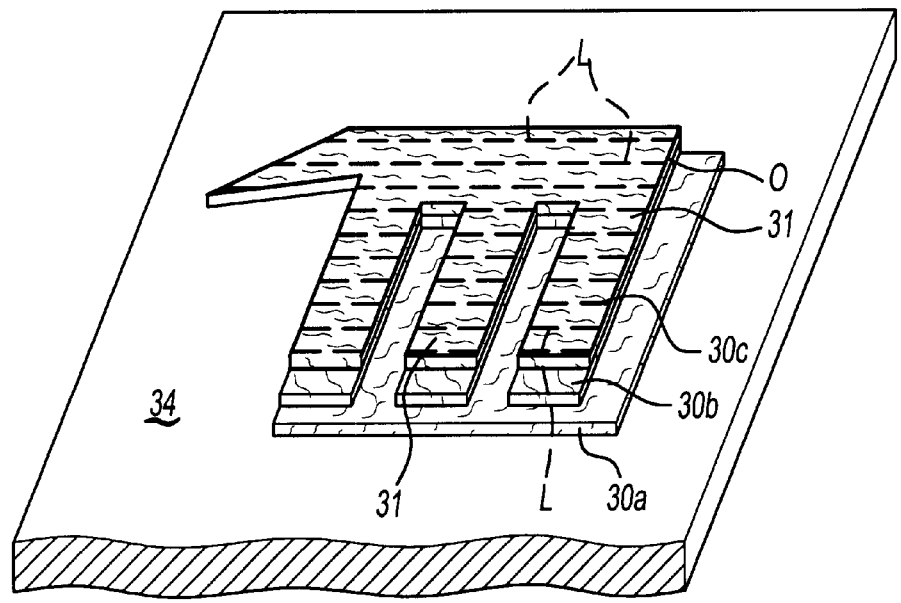
FIG. 4B is a schematic view of the next layer after the FIG. 4A layer of a composite material and the indicators provided by the present invention.

The computer module 40 again communicates with the indicator 38 to project a plurality of visible indicator lines L (FIG. 4B) upon the first composite material layer 30a which are representative of the desired fiber orientation for the second composite material layer 30b. The indicator 38 also projects an outline O of the second composite material layer 30b. The display 44 now indicates to the operator that he is currently performing the second lay-up step and additional information pertinent thereto.

As the operator positions the second composite material layer 30b, the computer module communicates with the sensor 36 to identify the fiber orientation of the second composite material layer 30b. Again, the CPU 42 compares the sensed fiber orientation to the proper predetermined orientation contained in the database for that particular step.

Additionally, the CPU preferably compares the second image of the second composite material layer 30b taken by the sensor 36 to the image taken of the properly positioned and oriented first material layer 30a previously stored in the storage device 44. The CPU 42 can thereby determine that the second composite material layer 30b has been located over the first composite material layer 30b, by the change in the image. It should be understood that the sensor 36 can take a plurality of images or maintain continues image coverage of the process and the CPU 42 will preferably identify particular stills to store in the storage device 42. The stills are preferably stored after a predetermined event, for example after confirmation of properly positioned and oriented composite material layer.

Composite material plies are typically provided with warp and fill "toe" identifiers to cue an operator. These identifiers are also preferably sensed by the sensor 36 and identified during the image comparison as assurance that the second composite material layer 30b has been located over the first composite material layer 30a. This may be particularly appropriate where two identical composite material layers having identical fiber orientation are sequentially provided in the lay-up. The image comparison will thus identify that the correct number of layers have been provided by such that the proper sequence is maintained by a change in the image.

Once proper orientation and position are confirmed the CPU 42 moves to the next step (next lay-up layer) in the database. This process continues until the lay-up is complete. Should, however, the operator fail to properly position or orient the composite material layer, the CPU 42 will identify the layer is incorrect and provide an alert to the operator. Preferably, the alert is provided on the display 44. The computer module 40 will also communicate with the indicator 38 to maintain the indicator lines L and outline O until the step is properly completed. The operator is thereby alerted to the improper step, provided with the proper indicator lines L and outline O while being prevented from proceeding to the next layer.

Furthermore, it is worth stating that the present invention is clearly not limited to a microprocessor based control system. The system may be implemented in a non-microprocessor based electronic system (either digital or analog).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fiber orientation verification system for manufacturing a multi-layer composite component comprising:
   a surface for receiving a plurality of composite material layers;
   an indicator for sequentially displaying a desired orientation of each of said plurality of composite material layers upon said surface;
   a sensor for sensing a fiber orientation of each of said plurality of composite material layers; and
   a controller in communication with said indicator and said sensor for comparing said fiber orientation of each of said plurality of composite material layers to a predetermined orientation.

2. The verification system as recited in claim 1, wherein said surface includes a mandrel.

3. The verification system as recited in claim 1, wherein said indicator includes a laser.

4. The verification system as recited in claim 3, wherein said laser projects a plurality of lines upon said surface, said plurality of lines indicative of a desired orientation of each of said plurality of composite material layers.

5. The verification system as recited in claim 1, wherein said sensor includes a digital camera.

6. The verification system as recited in claim 1, further including an operator interface which alerts an operator to an improper orientation of one of said plurality of composite material layers.

7. A method of verifying a proper orientation of each of a plurality of composite material layers during manufacturing of a multi-layer composite component comprising the steps of:
   (1) sensing a fiber orientation of a composite material layer;
   (2) comparing said sensed fiber orientation of said step (1) with a predetermined fiber orientation; and
   (3) identifying whether said sensed fiber orientation is equivalent to said predetermined fiber orientation of said step (2).

8. A method as recited in claim 7, wherein said step (1) further includes sensing a contrasting strand within the composite material layer.

9. A method as recited in claim 7, wherein said step (1) further includes sensing the fiber orientation within the electromagnetic spectrum.

10. A method as recited in claim 7, wherein said step (1) further includes sensing the fiber orientation within the visible light spectrum.

11. A method as recited in claim 7, further including the step of:
   displaying a desired fiber orientation for the composite material layer.

12. A method as recited in claim 7, further including the step of:
   displaying a desired fiber orientation of the composite material layer.

13. A method as recited in claim 7, further including the step of:
   displaying a desired location for the composite material layer upon a previous composite material layer.

14. A method as recited in claim 7, further including the step of:
   displaying a plurality of laser lines representative of a desired orientation of the composite material layer.

15. A method of verifying a proper orientation of each of a plurality of composite material layers during manufacturing of a multi-layer composite component comprising the steps of:
   (1) displaying a desired orientation for a composite material layer;
   (2) sensing a fiber orientation of the composite material layer;
   (3) comparing said sensed fiber orientation of said step (2) with a predetermined fiber orientation; and
   (4) identifying whether said sensed fiber orientation is equivalent to said predetermined fiber orientation of said step (3).

16. A method as recited in claim 15, wherein said step (2) further includes sensing a contrasting strand within the composite material layer.

17. A method as recited in claim 15, wherein said step (1) further includes capturing an image of the composite material layer.

18. A method as recited in claim 16, further including the step of:
   comparing a previously captured image of a composite material layer with a present image of the composite material layer.

19. A method as recited in claim 15, further including the step of:
   displaying a plurality of laser lines representative of a desired orientation of the composite material layer.

20. A fiber orientation verification system for manufacturing a multi-layer composite component comprising:
   a surface for receiving a plurality of composite material layers;
   an indicator for sequentially displaying a desired orientation of each of said plurality of composite material layers upon said surface;
   a sensor for sensing a fiber orientation of each of said plurality of composite material layers;
   a controller for comparing said fiber orientation of each of said plurality of composite material layers to a predetermined orientation; and
   an operator interface which alerts an operator to an improper orientation of one of said plurality of composite material layers.

21. A method of verifying a proper orientation of each of a plurality of composite material layers during manufacturing of a multi-layer composite component comprising the steps of:
   (1) displaying a plurality of laser lines representative of a desired orientation of a composite material layer;
   (2) sensing a fiber orientation of a composite material layer;
   (3) comparing said sensed fiber orientation of said step (2) with a predetermined fiber orientation; and
   (4) identifying whether said sensed fiber orientation is equivalent to said predetermined fiber orientation of said step (3).

22. A method of verifying a proper orientation of each of a plurality of plurality of composite material layers during manufacturing of a multi-layer composite component comprising the steps of:
   (1) displaying a plurality of laser lines representative of a desired orientation of the composite material layer.
   (2) sensing a fiber orientation of a composite material layer;
   (3) comparing said sensed fiber orientation of said step (2) with a predetermined fiber orientation; and
   (4) identifying whether said sensed fiber orientation is equivalent to said predetermined fiber orientation of said step (3).

* * * * *

UNITED STATES PATENT AND TRADEMARK OFFICE
CERTIFICATE OF CORRECTION

PATENT NO.     : 6,591,197 B2
DATED          : July 8, 2003
INVENTOR(S)    : Allen E. Trudeau and Jeffry C. Purse It is certified that error appears in the above-identified patent and that said Letters Patent is hereby corrected as shown below:

<u>Title page,</u>
Item [*] Notice, should be corrected as follows:

-- [*] Notice:  Subject to any disclaimer, the term of this patent is extended or adjusted under 35 U.S.C. 154(b) by 41 days. --

Signed and Sealed this

Seventh Day of October, 2003

JAMES E. ROGAN
*Director of the United States Patent and Trademark Office*